US006776490B2

(12) United States Patent
Soper et al.

(10) Patent No.: US 6,776,490 B2
(45) Date of Patent: Aug. 17, 2004

(54) DUAL IMAGE SLIDE AND/OR VIDEO PROJECTOR

(76) Inventors: Kevin James Soper, 2 Doradus Avenue, S.A. 5090 (AU); Philip Brendan Banks, 16 Araidne Crescent, Modbury Heights, S.A., 5092 (AU)

(*) Notice: Subject to any disclaimer, the term of this patent is extended or adjusted under 35 U.S.C. 154(b) by 0 days.

(21) Appl. No.: 10/181,015
(22) PCT Filed: Jan. 4, 2001
(86) PCT No.: PCT/AU01/00005
§ 371 (c)(1), (2), (4) Date: Nov. 4, 2002
(87) PCT Pub. No.: WO01/50186
PCT Pub. Date: Jul. 12, 2001

(65) Prior Publication Data
US 2003/0137638 A1 Jul. 24, 2003

(30) Foreign Application Priority Data
Jan. 4, 2000 (AU) .............................................. PQ4940

(51) Int. Cl.[7] ........................... G03B 21/00; G03B 21/26
(52) U.S. Cl. ........................................ 353/30; 353/122
(58) Field of Search .............................. 353/7, 30, 122

(56) References Cited

U.S. PATENT DOCUMENTS

| 5,283,599 A | 2/1994 | Tejima et al. .................. 353/30 |
| 5,669,690 A | * 9/1997 | Hodson et al. ............. 353/122 |
| 5,772,301 A | 6/1998 | Kwon et al. ................. 353/122 |

FOREIGN PATENT DOCUMENTS

| EP | 89-041782/06 | 10/1984 | |
| EP | 734184 B1 | 1/2001 | ............ H04N/5/74 |
| JP | 08029732 A | 3/1996 | |
| JP | 09211724 A | 8/1997 | ........... G03B/21/00 |

* cited by examiner

Primary Examiner—Christopher Mahoney
(74) Attorney, Agent, or Firm—Francis Law Group

(57) ABSTRACT

A dual image displaying apparatus (10) is disclosed including a first light source (12) for emitting light through a first image (14) onto a surface and a second light source (20) for emitting light through a second image (22) onto the same or another surface. The first image may be produced by a slide whilst the second image is produced by a display receiving and converting electrical image information into the second image. Typically, this is a liquid crystal display (LCD). The apparatus further includes a plurality of filters and other optical components (16, 24, 30, 32) to assist in producing a good quality image as well as protecting the LCD. Instead of a slide, the first image may also be produced by an LCD.

8 Claims, 2 Drawing Sheets

DUAL IMAGE SLIDE AND/OR VIDEO PROJECTOR

The present invention relates to an image projector with two or more image projecting capabilities. In particular the present invention may be used to simultaneously display static and a moving image and wherein the moving image may be provided by the use of a liquid crystal display panel (LCD).

BACKGROUND OF THE INVENTION

Slide and movie projectors are well known and have been used for a number of years. In their simplest form they include of a light source that projects an image to a screen. There are numerous types of projectors such as slide projectors that are adapted to transmit light through a photographic slide. Lately, there have been proposed image projectors that use a fixed LCD to project a moving image. These devices do not, however, allow the use of conventional slides, being dedicated to the use of LCD's to display an image.

The technological advances of LCD's, and especially the total number of pixels being in the hundreds of thousands, have meant that the resolution of images using LCD's is of a very high quality. Hence it is desirable to use LCD projectors not only in the business but also the personal environment. However, there are a still a large number of images only available on conventional slides and a dedicated LCD projector apparatus would not be able to display those images. Consequently it may be necessary to have a number of different projecting apparatus including video image projectors and slide projectors.

Furthermore, there is at times a requirement to project several images simultaneously. For example, one may project two images of different data or two scenes. Once again, one of the images may be that from a slide whilst the other may be produced by the use of an LCD. There is currently no apparatus known to the applicant of being able to produce two different images, at least one of which may be an image from a conventional slide.

It is therefore an object of the present invention to overcome at least some of the abovementioned problems or to provide the public with a useful alternative by providing for an image display apparatus adapted to project at least two images, wherein at least one of the images is produced by the use of a LCD, whilst the other may be produced either from another LCD panel or a conventional slide.

BRIEF SUMMARY OF THE INVENTION

Therefore, in one form of the invention, though this need not be the only or indeed the broadest form there is provided an image displaying apparatus including:

a first light source for emitting light though a first image onto a surface;

a second light source for emitting light through a second image onto the same or another surface;

wherein said second image is produced by a display receiving and converting electrical image information into the second image.

In preference said display is a liquid crystal display panel.

Preferably said first image is a conventional photographic slide.

Preferably the first image is produced by a display receiving and converting electrical image information into the first image.

Advantageously disposed between said second image and said second light source is at least one filter.

Advantageously said filter is at least a ultra-violet or infrared filter.

In preference disposed between the second image and the second light source is a heat filter.

In a further form of the invention there is proposed an image projecting apparatus adapted for the projection of at least two images including:

a first light source adapted to project light through a first image, through at least one optical component, focussing lens and onto a surface;

a second light source adapted to project light through a second image, through at least one other optical component, focussing lens and onto a second surface, said second image being produced by a liquid crystal display screen;

a plurality of filters disposed between said light sources and said images.

Advantageously the focussing lenses are adapted to be angularly adjustable the two images are adapted to be superimposed on each other.

In preference said apparatus further includes a video or compact disc media player.

Preferably the image projecting apparatus further includes a television screen to display the image to be played through the image display.

Other objects and advantages of the present invention will become apparent in view of the following detailed description and accompanying drawings.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

Figure 1:
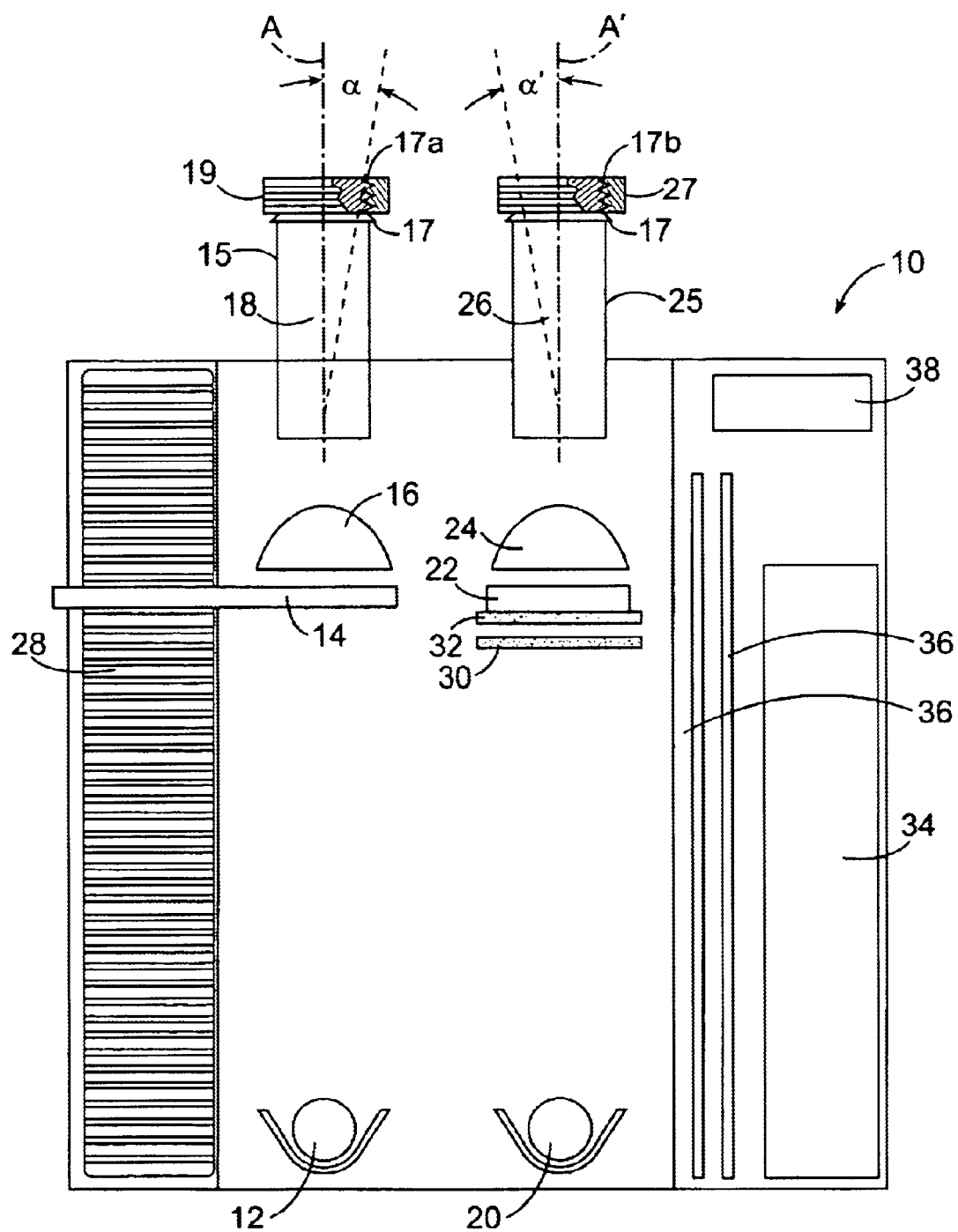
FIG. 1 illustrates a top cross-sectional view of a typical dual image projector according to the present invention.
Figure 2:
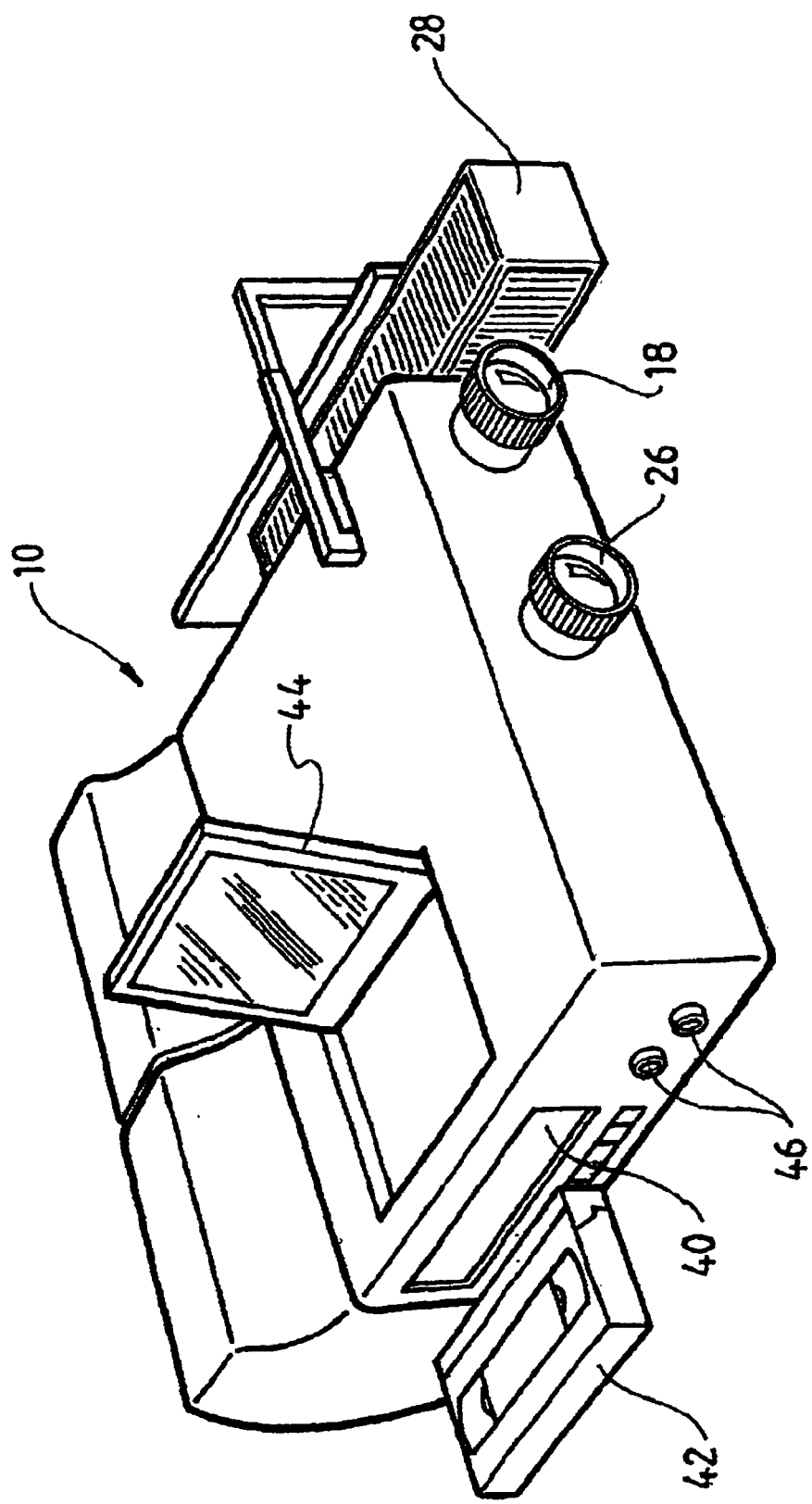
FIG. 2 illustrates a general perspective view of a dual image projector.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

With reference to the above figures there is shown a dual image projection apparatus 10 including a first light source 12 for emitting light through a first image display device 14, said light then optically modified by optical components 16 and passing through a second image display device 22, said light then optically modified by second optical components 24 and passing through a second focussing lens 26 to be displayed on a screen.

The light sources 12 and 20 are lamps of the type generally found in slide projectors. The optical components 16 and 24 may include various filters such as infrared filters, ultra-violet filters and polarisers.

The first image display device can either be a conventional photographic slide or a LCD adapted to be used as a conventional slide. Consequently, the apparatus further includes a slide holder 28 which can support multiple slides and which in operation can be controlled to feed different slides into the apparatus.

The second image display slide is a fixed LCD panel that also includes appropriate filters to protect the LCD from the parts of the spectrum of the second light source. Typically, said filters will include a ultra-violet, infrared and pre-polariser filter 30 as well as polariser 32. The LCD may also further include heat shields that can either be integral with the filters or are separately positioned between the second light source and the LCD panel.

As disclosed by the applicant in co-pending application entitled "IMPROVEMENTS IN LCD'S ADAPTED FOR IMAGE PROJECTION USING A SLIDE PROJECTOR OR OTHER LIGHT SOURCE" which is intended to be incorporated by reference herein, using a conventional LCD in a typical slide projector will cause irreversible damage to the LCD under the influence of damaging ultraviolet and infra-red radiation. The use of heat shields alone will not completely eliminate the damage to the LCD because ultra violet rays degrade the LCD and the epoxy plug that holds the liquid crystal in place, causing leakage and degradation which could lead to the destruction of the LCD panel in time.

That co-pending application overcomes the problems of using a conventional LCD in a projector. Up to three filters are provided being a polarising filter, an ultraviolet filter, and a heat/infra red filter. For convenience the filters may be mounted integrally on the LCD panel although it is to be understood that this is a preferred not an essential feature.

The polarising filter is mounted on the LCD side facing the lamp within the slide projector. Disposed on top of the polarising filter is the ultra-violet filet. The heat/infra red filter must be located as far as is practicable form the LCD. In manufacture, the three filters may be sequentially placed on the LCD. Alternatively, they may be adhered to each other to provide for a laminated construction and then mounted on the LCD. The mounting may be achieved using suitable mechanical brackets or fasteners such as retaining clips.

Furthermore, in a preferred embodiment there is a preferred order in the placement of filters.

Of course, it is important that the filters that block heat or other potentially damaging parts of the spectrum be located as far from the panel as practicable to ensure no damage to the LCD. It is also necessary to use polarisers on the other side of the LCD. That depends very much on the particular structure of the LCD which can be bought as an off-the shelf product. It is also to be understood that the polarisation must be linear so that the image that is projected is of the highest quality definition.

The use of thin filters advantageously allows the LCD device to be constructed of a size able to be inserted into a conventional slide projector enabling an image to be formed whilst protecting the LCD. The filters do not need to be mounted integrally on the LCD but may form a separate laminate construction that is locked into place adjacent the LCD in a housing made up of two shells that engage the LCD panel and the laminate filter construction. The construction housing may have ventilation holes/slots to allow circulation of air between the LCD panel and the filters thus further protecting the LCD.

The shells may be correspondingly shaped and designed that one is slightly smaller than the other and frictionally engage each other. Alternatively, the housings may have appropriate lugs and recesses and may be joined together in a snap-lock type of arrangement.

Thus, the present invention also uses those particular filters and in that order to ensure that the LCD is protected. These filters may also be removable wherein on of the images is a conventional slide and the various filters are not required.

The apparatus includes a power supply 34 providing electrical power to the two light sources and electronic circuit boards 36 that assist in providing an image to the LCD panel 22. The whole apparatus may be controlled via remote control, receiver 38 adapted to receive remote information from a transmitter (not shown).

The focussing lenses 18 and 26 enable an image of different sizes to be displayed on a screen or other surface area. Obviously, the greater the distance between the focusing lenses and the screen, the larger the image.

According to the invention, each lens 18, 26 includes conventional adjustment means for changing the focal length between the optical components 16, 24 and the lenses 18, 26. As will be appreciated by one having ordinary skill in the art, the adjustment means can comprise various mechanical arrangements.

In a preferred embodiment, each lens body 15, 25 includes a threaded end 17a, 17b having a plurality of threads 17 disposed thereon. The lens caps 19, 27 include internal threads that are adapted to cooperate with the lens body threads 17, wherein when the caps 19, 27 are rotated on the lens bodies 15, 25 the focal length between the lens caps 19, 27 and, hence, optical lenses disposed therein, and the optical components 16, 24 changes, whereby the focus of the images on the screen changes.

The focusing lenses 18 and 26 are further preferably adapted to be angularly adjustable, whereby the two images projected by the lenses 18, 26 can be superimposed on each other. By the term "angularly adjustable", as used herein, it is means to mean that the lenses 18, 26 are adapted to rotate on substantially coincident planes forming angles $\alpha$ and $\alpha'$ with respect to their longitudinal axes, designated A and A', respectively (See FIG. 1).

The apparatus 10 may include other additional features such as a video tape player 40 adapted to play vide tapes 42 and further including a viewing screen 44 allowing the tape to be viewed either before and/or during the image being projected through lens 26. The apparatus may also include input connectors 46 allowing an external electrical signal to be fed to it.

Thus the present invention is for an apparatus that is not only capable of projecting video images but has the additional advantage of being a slide projector as well. The LCD panel can be activated independently of the slide display. In fact the slide display can itself include a LCD panel so that there may be two video images displayed by the apparatus. The slide mechanism may be a conventional one, either top or side loading.

It is also understood that additional features may be added to the present apparatus including but not limited to the following:

over-temperature cut-out to protect the slide and/or LCD amplifier with external speakers and a microphone jack disc drive for CD-ROM's or DVD's for showing prepared presentations zoom/focussing optical componentry television tuner card image manipulation capabilities such as mirroring and reversing to use in rear projection.

audio output for connection to external sound systems battery power on screen display remote I/R laser pointer video sender in remote control video sender T/R—wireless Other improvements to the apparatus may be the ability to change the angle of the projection of one image compared to the other. Consequently, it may be possible to superimpose the images onto each other.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. An image displaying apparatus, comprising:

a first light source for emitting first light, said first light being transmitted substantially linearly though a first image onto a first surface, said first image being produced by a first display receiving and converting first electrical image information into said first image; and a second light source for emitting second light, said second light being transmitted substantially linearly through a second image onto said first surface, said second image being produced by said first display receiving and converting second electrical image information into said second image.

2. The image displaying apparatus of claim 1, wherein said display comprises a liquid crystal display panel.

3. The image displaying apparatus of claim 1, wherein said first image comprises a conventional photographic slide.

4. An image projecting apparatus adapted for the projection of at least two images, comprising:

a first light source adapted to project first light substantially linearly through a first image and at least one first optical component to a first focussing lens;

a second light source adapted to project second light substantially linearly through a second image and at least a second optical component to a second focussing lens, said second image being produced by a liquid crystal display screen, said first and second lenses being angularly adjustable, whereby said first and second images can be superimposed on each other; and a plurality of filters disposed between said first and second light sources and said first and second images.

5. The image displaying apparatus of claim 4, wherein said plurality of filters include a ultra-violet filter, an infrared filter and a pre-polariser filter.

6. The image displaying apparatus of claim 4, wherein said apparatus includes at least one heat shield.

7. The image displaying apparatus of claim 6, wherein said heat shield is disposed between said second light source and said display screen.

8. A method of displaying an image on a display screen, comprising the steps of:

providing an image displaying device having a first light source, said first light source being adapted to emit first light;

transmitting said first light through a first image display device;

optically modifying said first light with at least a first optical component to provide first optically modified first light;

transmitting said first optically modified first light through a second image display device;

optically modifying said first optically modified first light with at least a second optical component to provide second optically modified first light; and transmitting said second optically modified first light through a focussing lens onto the display screen.

* * * * *